(12) United States Patent
Nomura

(10) Patent No.: US 7,984,201 B2
(45) Date of Patent: Jul. 19, 2011

(54) COMMUNICATION APPARATUS AND CONTROL METHOD FOR THE COMMUNICATION APPARATUS

(75) Inventor: Kenji Nomura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1735 days.

(21) Appl. No.: 11/057,124

(22) Filed: Feb. 15, 2005

(65) Prior Publication Data

US 2006/0045037 A1 Mar. 2, 2006

(30) Foreign Application Priority Data

Jul. 14, 2004 (JP) .................... 2004-207233

(51) Int. Cl.
*G06F 3/00* (2006.01)
(52) U.S. Cl. .................... 710/15; 710/8; 710/10
(58) Field of Classification Search ............ 710/8, 10, 710/15
See application file for complete search history.

(56) References Cited

U.S. PATENT DOCUMENTS 6,460,094 B1 * 10/2002 Hanson et al. ............. 710/8
6,886,052 B2 * 4/2005 Chiu et al. ................. 710/14

FOREIGN PATENT DOCUMENTS

| JP | A-11-288338 | 10/1999 |
|---|---|---|
| JP | A-2000-163358 | 6/2000 |
| JP | A-2000-293479 | 10/2000 |
| JP | 2001-502155 | 2/2001 |
| JP | A-2002-140136 | 5/2002 |
| JP | A-2002-229685 | 8/2002 |

OTHER PUBLICATIONS

Refusing Reason Notice for Japanese Application No. 2004-207233, mailed on Feb. 16, 2010 (w/ English translation).
Office Action issued in Japanese Patent Application No. 2004-207233 mailed on Aug. 10, 2010 (w/English-language Translation).
Universal Serial Bus Specification, Revision 2.0, Apr. 27, 2000.

* cited by examiner

*Primary Examiner* — Henry W Tsai
*Assistant Examiner* — Kris Rhu
(74) *Attorney, Agent, or Firm* — Oliff & Berridge PLC

(57) ABSTRACT

A communication apparatus comprises a connection notifying unit that causes a communication destination party to detect a connection; an interface unit that requires startup processing, and controls a communication with the communication destination party after the startup processing is completed; and a connection notification control unit that changes a state of the connection notifying unit to a state of causing the communication destination party to detect the connection before the startup processing of the interface unit is completed.

14 Claims, 6 Drawing Sheets

COMMUNICATION APPARATUS AND CONTROL METHOD FOR THE COMMUNICATION APPARATUS

FIELD OF THE INVENTION

The present invention relates to a communication apparatus and a control method for the communication apparatus, and more particularly relates to a communication apparatus and a control method for the communication apparatus which enables to cause a destination party of a communication to recognize a connection before the start of the communication.

DESCRIPTION OF THE RELATED ART

In a system in compliance with a standard referred to as USB (Universal Serial Bus), information is transmitted/received between a master station and a slave station. The master station can communicate with plural slave stations. Generally, the master station is disposed on the side of an information processing apparatus such as a PC (personal computer), and the slave station is disposed on the side of a peripheral apparatus used by the PC.

In general, when a slave station is turned on or is supplied with a power from the master station, the slave station pulls up the potential of the D+ line or D− line, which are signal lines for a data communication, through a pull-up resistor by means of a drive potential for the slave station. The master station detects the pulled-up potential so as to detect the connection to the slave station.

When the master station detects the connection to the slave station, the master station, after an elapse of a certain period, carries out the recognition of the communication speed of the slave station, the allotment of an address to the slave station, the recognition of a device type of an apparatus on which the slave station is provided, and the like. Thereafter, the master station starts the communication with the slave station.

Therefore, the apparatus on which the slave station is provided must complete the startup between a time when the power is turned and a time when the communication with the master station starts.

There is recently a tendency in which various types of apparatuses utilizing the USB standard are provided. Among these apparatuses, some types of apparatuses require a long period of time for the startup. In such types of apparatuses, it is necessary to use expensive components in order to complete the startup within a certain period of time.

In view of this problem, a technology was proposed in which instead of pulling up the potential of the D+ line or D− line when the electric power is supplied, the potential of the D+ line or D− line is pulled us after the startup of an apparatus is completed so as to delay the start of the communication with the master station (refer to JP 2001-502155A, for example.)

However, according to the technology described in JP 2001-502155A, since the apparatus is so designed that the potential of the D+ line or D− line is pulled up after the startup of the apparatus is completed, it is not possible to communicate with the master station until a certain period elapses after the startup of the apparatus.

SUMMARY OF THE INVENTION

The present invention has been made in view of the above circumstances and provide a communication apparatus and a control method for the communication apparatus which can promptly start a communication with a destination party such as a master station after the startup of the communication apparatus.

According to one aspect of the present invention, a communication apparatus comprises a connection notifying unit that causes a communication destination party to detect a connection; an interface unit that requires startup processing, and controls a communication with the communication destination party after the startup processing is completed; and a connection notification control unit that changes a state of the connection notifying unit to a state of causing the communication destination party to detect the connection before the startup processing of the interface unit is completed.

With the configuration of the present invention, since the communication destination party is caused to detect the connection before the startup processing of the interface means is completed, it is possible to promptly start the communication after the completion of the startup of the interface means and the like.

BRIEF DESCRIPTION OF THE DRAWINGS

Embodiments of the present invention will be described in detail based on the following drawings, wherein.

DESCRIPTION OF THE EMBODIMENTS

A detailed description will now be given of embodiments of a communication apparatus and a control method for the communication apparatus according to the present invention with reference to accompanying drawings.

Figure 1:
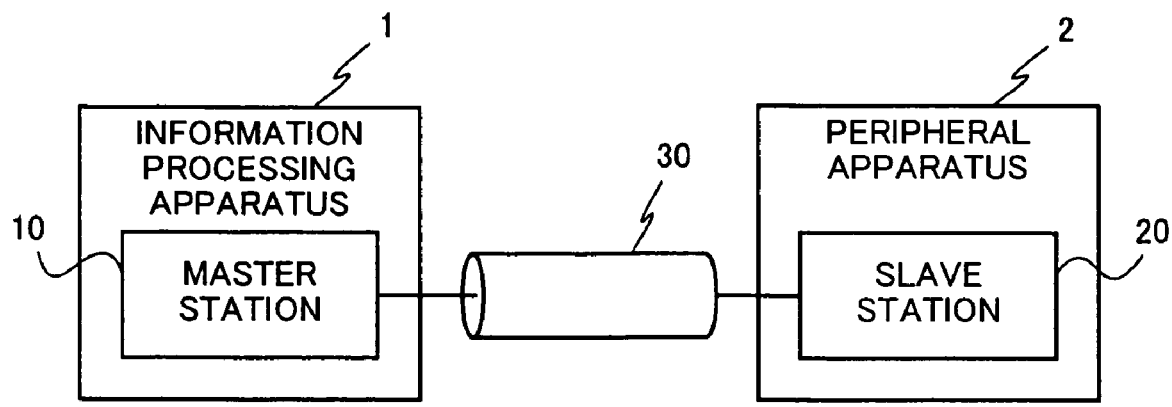
FIG. 1 shows an example of the configuration of an information processing system to which the present invention is applied.

FIG. 1 shows an example of the configuration of an information processing system to which the present invention is applied. In the configuration shown in FIG. 1, an information processing apparatus 1 such as a PC and a peripheral apparatus 2 thereof respectively including a master station 10 and a slave station 20. The master station 10 and the slave station 20 communicate with each other via a cable 30.

Figure 2:
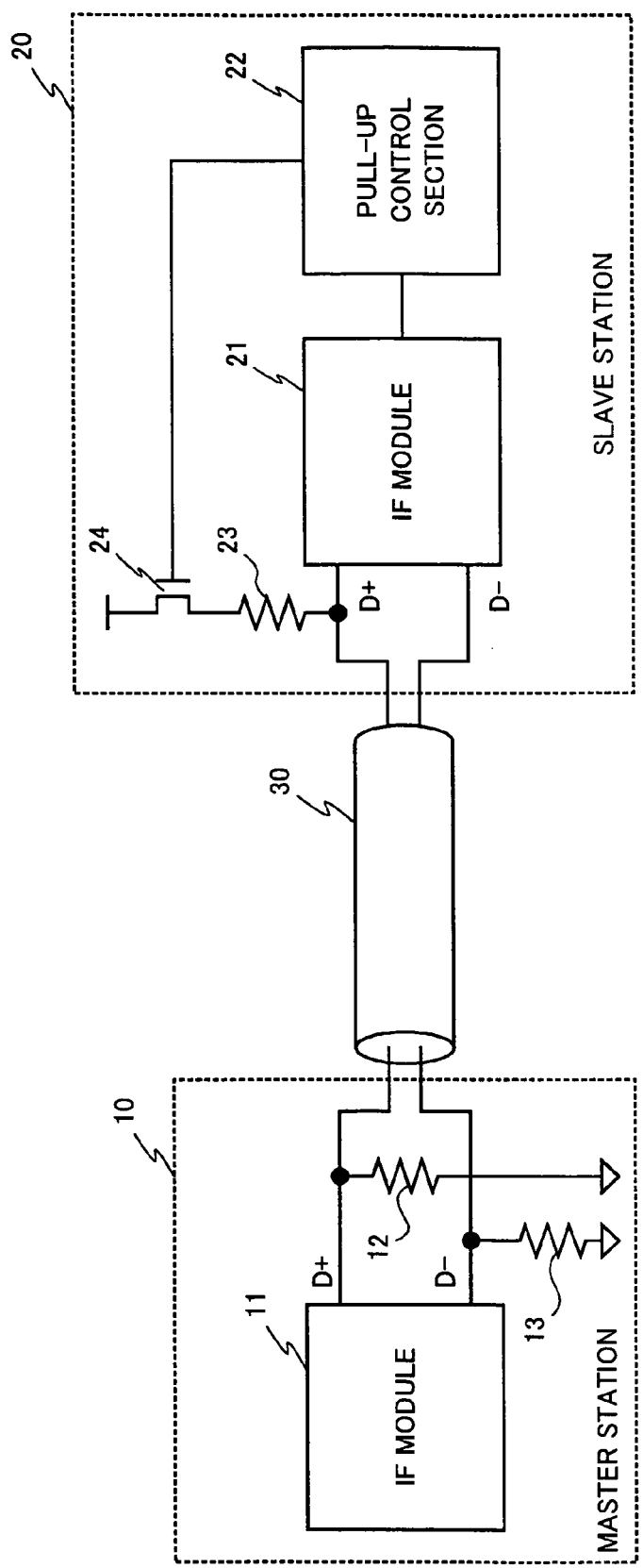
FIG. 2 shows a schematic configuration of a master station 10 and a slave station 20.

A description will now be given of the master station 10 and the slave station 20. FIG. 2 shows a schematic configuration of the master station 10 and the slave station 20.

Referring to FIG. 2, the master station 10 comprises an IF (interface) module 11, a pull-down resistor 12, and a pull-down resistor 13, and the slave station 20 comprises an IF module 21, a pull-up control section 22, a pull-up resistor 23, and a switch 24. The master station 10 and slave station 20 are connected with each other via the cable 30 including a D+ line and a D− line, which are signal lines used for transmitting/receiving data.

The master station 10 detects that the potential of either the D+ line or D− line is pulled up, thereby to detect the connection to the slave station 20. According to the USB standard, pulling up of the potential of the D− line is performed by a slave station provided on a peripheral apparatus which communicates in the LS (Low Speed) mode, and pulling up of the potential of the D+ line is performed by a slave station provided on a peripheral apparatus which communicates in the FS (Full Speed) mode or HS (High Speed) mode.

The communication in the HS mode is carried out after the slave station pulls up the potential of the D+ line so as to cause the master station to recognize that the slave station operates in the FS mode, and then performs communications with the master station so as to cause the master station to recognize that the communication is carried out in the HS mode. The slave station 20 shown in FIG. 2 is configured so that the potential of the D+ line is pulled up via the pull-up resistor 23, and thus the slave station 20 operates in the FS or HS mode. Alternatively, the configuration may be changed so that the potential of the D− line is pulled up so that the communication carries out in the LS mode.

The slave station 20 is configured such that the pull-up control section 22 controls the switch 24 so as to control the connection between the pull-up resistor 23 and an electric potential supply line, thereby enabling the control of the pull-up of the potential of the D+ line.

The present invention is applied to the slave station 20, and is characterized by the operations of the pull-up control section 22.

Figure 3:
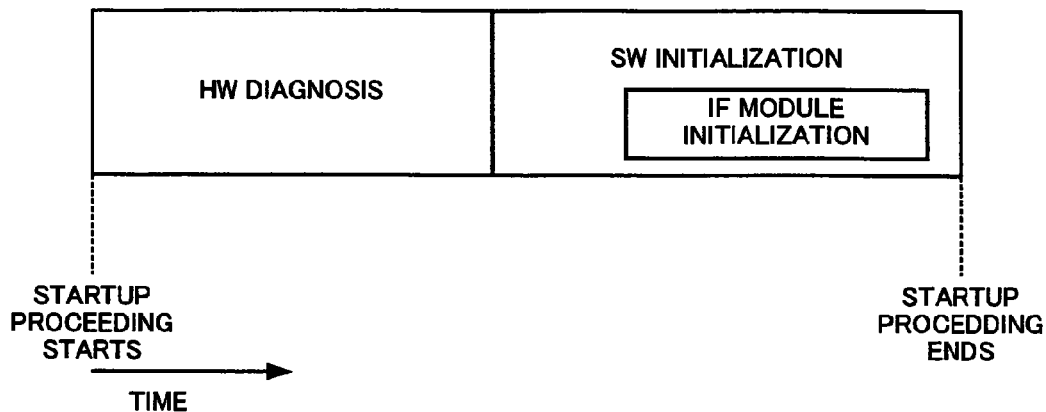
FIG. 3 shows a flow of an operation of a peripheral apparatus 2.

Before embodiments of the present invention are described, a description will first be given of the flow of the operations of the peripheral apparatus 2. FIG. 3 shows the flow of the operations of the peripheral apparatus 2.

The peripheral apparatus 2 starts the startup processing by turning on the peripheral apparatus 2, then diagnosis of HW (hardware) is first carried out. If no abnormality is found in the HW, the peripheral apparatus 2 initializes SW (software). The startup processing ends when the initialization of the SW is completed (Here, the SW initialization starts after the HW diagnosis in the diagram for the sake of the simple description. However, the HW diagnosis and the SW initialization are not clearly separated usually). In the initialization of the SW, initialization of the IF module 21 of the slave station 20 is included.

Figure 4:
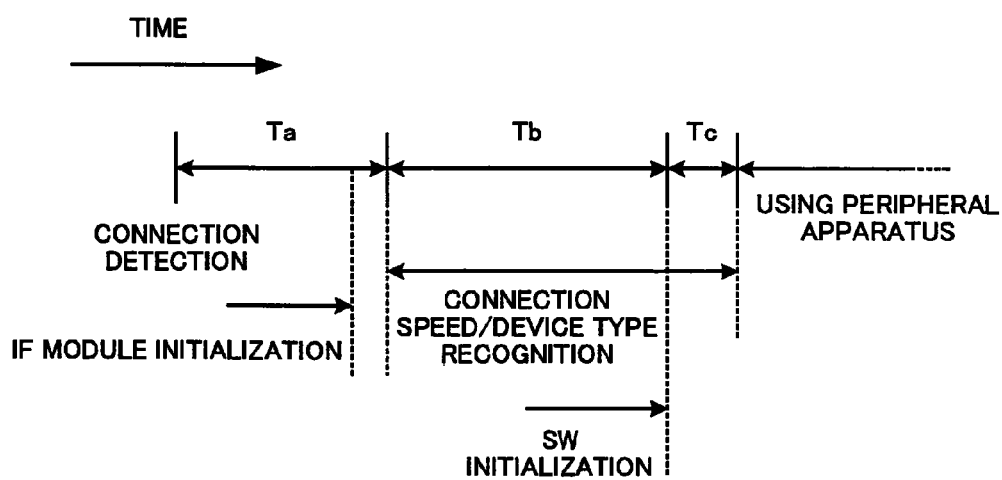
FIG. 4 shows a flow of processing until a communication starts.

A description will now be given of conditions for the peripheral apparatus 2 to communicate with the information processing apparatus 1. FIG. 4 shows a flow of processing before the communication starts.

When a period of Ta is elapsed after the master station 10 detects the connection with the slave station 20, the master station 10 recognizes the connection speed with the slave station 20 and the type of the peripheral apparatus 2. Since this processing is carried out by the IF module 21 on the slave station 20, the IF module 21 has to complete the startup by the time when the period Ta is elapsed after the master station 10 detected the connection with the slave station 20. Note that the period Ta takes a value specified by the Standard.

After the master station 10 recognizes the connection speed with the slave station 20 and the type of the peripheral apparatus 2, the communication between the information processing apparatus 1 and the peripheral apparatus 2 starts.

In the USB standard, an operation of the master station 10 triggers the communication between the information processing apparatus 1 and the peripheral apparatus 2. By the time when the peripheral apparatus 2 becomes usable as an intended device, namely by the time when a period of Tb is elapsed after the master station 10 started to recognize the connection speed with the slave station 20 and the type of the peripheral apparatus 2, the peripheral apparatus 2 has finished the initialization of the SW Thus, the peripheral apparatus 2 becomes usable as an intended device. A situation may occur in which the period required for the recognition of the connection speed and the recognition of the type of the peripheral apparatus 2 is longer than the period Th required for the initialization of the SW In such a situation, the peripheral apparatus becomes usable as a device after the recognition of the connection speed and the recognition of the type of the peripheral apparatus 2 are completed (if Tc>0 or Tc=0, the peripheral apparatus becomes usable after the initialization of the SW is completed).

As described above, the time point when the startup of the IF module 21 is completed is an important factor for the communication between the master station 10 and the slave station 20. This time point is specified by a time point when the master station 10 detects the connection with the slave station 20. Therefore, in the slave station 20, the pull-up control section 22 controls the switch 24 so that master station 10 can detect the connection to the slave station 20 at a proper time point.

Thus, a description is respectively given of the following respective embodiments according to time points when the pull-up control section 22 controls the switch 24.

Embodiment 1

Figure 5:
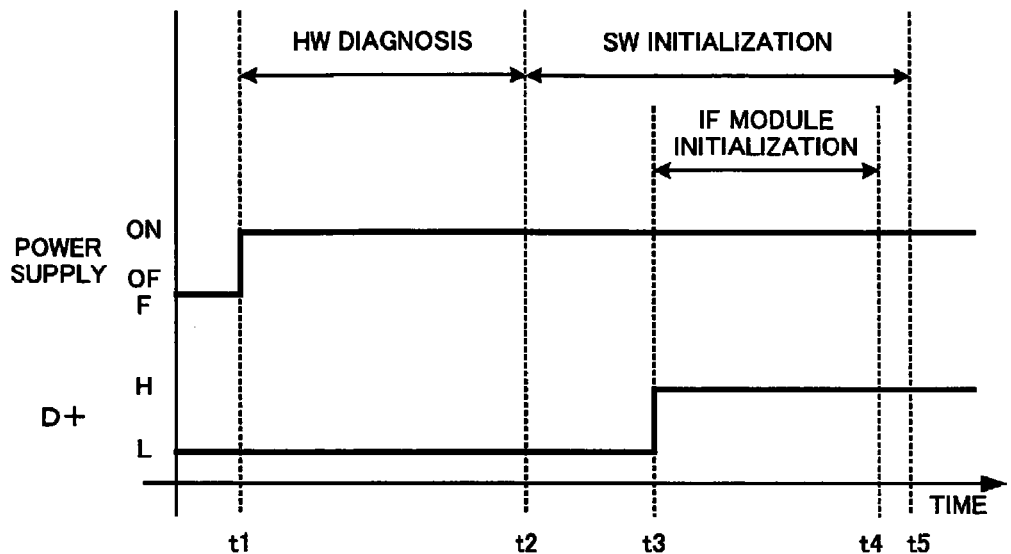
FIG. 5 shows a time point when the potential of the D+ line is pulled up according to an embodiment 1.

FIG. 5 shows a time point when the potential of the D+ line is pulled up according to an embodiment 1. Referring to FIG. 5, the HW diagnosis starts at time t1, and the initializations of the SW and IF module 21 start respectively at time t2 and time t3. The initialization of the IF module 21 is completed at time t4, and the initialization of the SW is completed at time t5.

In the embodiment 1, the pull-up of the potential of the D+ line is carried out at the time t3 when the initialization of the IF module 21 starts. Therefore, the pull-up control section 22 monitors the IF module 21, and turns on the switch 24 so as to pull up the potential of the D+ line when the pull-up control section 22 detects the start of the initialization of the IF module 21, or simultaneously with an instruction of the IF module initialization being issued.

The IF module 21 generally starts up within a period shorter than the period Ta shown in FIG. 4, and thus the master station 10 has not yet started the recognition of the connection speed and the like when the startup of the IF module 21 is completed at the time t4. Therefore, if the period required for the startup of the SW of the peripheral apparatus 2 is relatively short, more precisely, if the period (t5-t3) is shorter than a period (Ta+Tb), it may be so designed that the potential of the D+ line is pulled up simultaneously with the start of the initialization of the IF module 21 so that it is possible to promptly start the communication between the information processing apparatus 1 and the peripheral apparatus 2.

Embodiment 2

Figure 6:
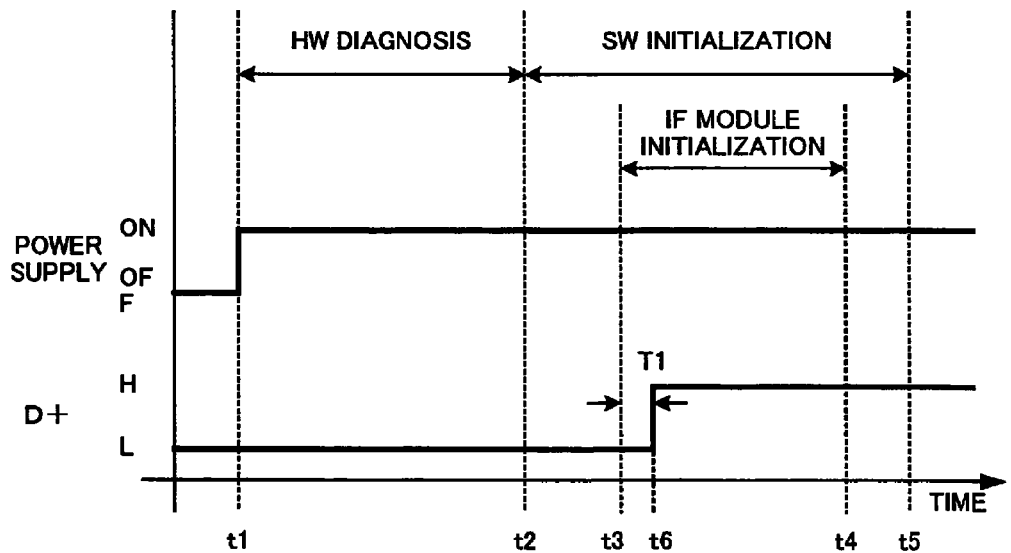
FIG. 6 shows a time point when the potential of the D+ line is pulled up according to an embodiment 2.

FIG. 6 shows a time point when the potential of the D+ line is pulled up according to an embodiment 2. Referring to FIG. 6, the HW diagnosis starts at the time t1, and the initializations of the SW and IF module 21 start respectively at the time t2 and the time t3. The initialization of the IF module 21 is completed at the time t4, and the initialization of the SW is completed at the time t5.

In the embodiment 2, the pull-up of the potential of the D+ line is carried out at time t6 when a period T1 has elapsed since the initialization of the IF module 21 starts. Therefore, the pull-up control section 22 monitors the IF module 21, and starts the measurement of the period T1 when the pull-up control section 22 detects the start of the initialization of the IF module 21, or simultaneously with the instruction of the IF module initialization being issued. When it is detected that the period T1 has elapsed, the pull-up control section 22 turns on the switch 24 so as to pull up the potential of the D+ line.

Since the IF module 21 generally starts up within a period shorter than the period Ta shown in FIG. 4, it may be so designed that the period T1 is set such that the period (t4-t6) is shorter than the period Ta so that the startup processing of the IF module 21 can be completed by the start of the recognition of the connection speed and the like by the master station 10. In addition, it may be so designed that the period T1 is set such that the period (t5-t6) is shorter than the period (Ta+Tb) to pull up the potential of the D+ line at the time point when the period T1 has elapsed since the start of the initialization of the IF module 21, whereby the communication is promptly started between the information processing apparatus 1 and the peripheral apparatus 2.

Embodiment 3

Figure 7:
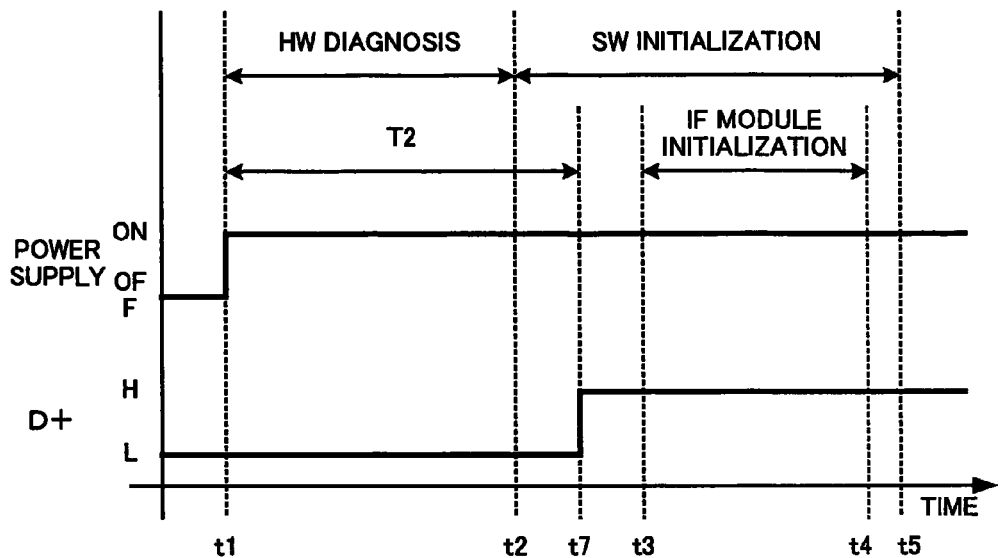
FIG. 7 is a diagram (1) showing a time point when the potential of the D+ line is pulled up according to an embodiment 3.
Figure 8:
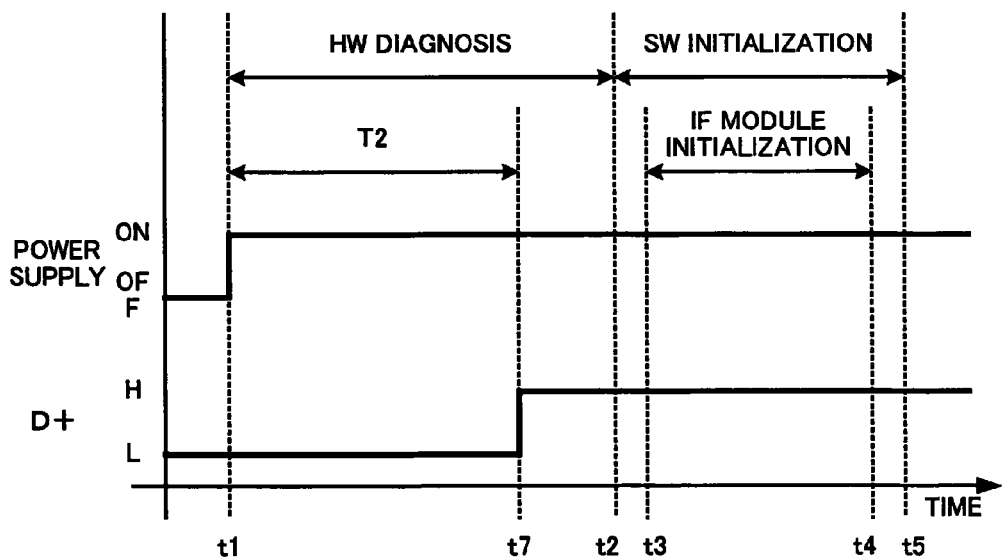
FIG. 8 is a diagram (2) showing a time point when the potential of the D+ line is pulled up according to the embodiment 3.

FIG. 7 and FIG. 8 show time points when the potential of the D+ line is pulled up according to an embodiment 3. Referring to FIGS. 7 and 8, the HW diagnosis starts at the time t1, and the initializations of the SW and IF module 21 start respectively at the time t2 and the time t3. The initialization of the IF module 21 is completed at the time t4, and the initialization of the SW is completed at the time t5.

In the embodiment 3, the pull-up of the potential of the D+ line is carried out at time t7 when a period T2 has elapsed since the peripheral apparatus 2 is turned on. When the peripheral apparatus 2 is turned on, namely, when the pull-up control section 22 is started up, the pull-up control section 22 starts the measurement of the period T2. When the period T2 has elapsed, the pull-up control section 22 turns on the switch 24 so as to pull up the potential of the D+ line. Note that the time t7 may be either during the SW initialization as shown in FIG. 7, or during the HW diagnosis as shown in FIG. 8. The time t7 may also be during the initialization of the IF module 21.***

In this case, by setting the period T2 such that the period (t4-t7) is shorter than the period Ta, the startup processing of the IF module 21 can be completed by the time of starting the recognition of the connection speed and the like by the master station 10, and by setting the period T2 such that the period (t5-t7) is shorter than the period (Ta+Tb), the startup processing of the peripheral apparatus 2 can be completed before the communication is started between the information processing apparatus 1 and the peripheral apparatus 2. Thus, it is possible to promptly start the communication between the information processing apparatus 1 and the peripheral apparatus 2.

Embodiment 4

Figure 9:
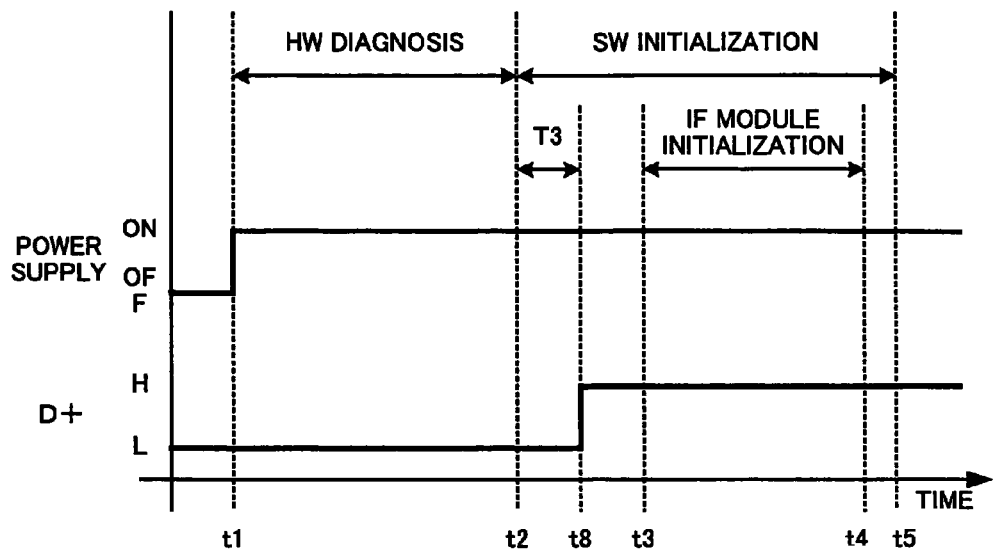
FIG. 9 shows a time point when the potential of the D+ line is pulled up according to an embodiment 4.

FIG. 9 shows a time point when the potential of the D+ line is pulled up according to an embodiment 4. Referring to FIG. 9, the HW diagnosis starts at the time t1, and the initializations of the SW and IF module 21 start respectively at the time t2 and the time t3. The initialization of the IF module 21 is completed at the time t4, and the initialization of the SW is completed at the time t5.

In the embodiment 4, the pull-up of the potential of the D+ line is carried out at time t8 when a period T3 has elapsed since the HW diagnosis of the peripheral apparatus 2 is completed. The pull-up control section 22 starts the measurement of the period T3 when the peripheral apparatus 2 detects the completion of the HW diagnosis or the start of the SW initialization. When it is detected that the period T3 has elapsed, the pull-up control section 22 turns on the switch 24 so as to pull up the potential of the D+ line. Note that there is a possibility that the time t8 may coincide with the time t2, namely the period T3 may be 0 (zero), or may be between the time t3 and the time t4, namely during the initialization of the IF module 21.

In this case, by setting the period T3 such that the period (t4-t8) is shorter than the period Ta, the startup processing of the IF module 21 can be completed by the start of the recognition of the connection speed and the like by the master station 10, and by setting the period T3 such that the period (t5-t8) is shorter than the period (Ta+Tb), the startup processing of the peripheral apparatus 2 can be completed before the communication is started between the information processing apparatus 1 and the peripheral apparatus 2. Thus, it is possible to promptly start the communication between the information processing apparatus 1 and the peripheral apparatus 2.

Embodiment 5

In the embodiment 5, a description will be given of actions to take when the peripheral apparatus 2 fails for some reasons in the initialization of the SW or the initialization of the IF module 21, and when the initialization of the IF module 21 is not completed in time before the start of the communication with the master station. Although processing in the embodiment 5 may be combined with the respective processing described in the embodiments 1 to 4, the description will now be given of a case of the combination with the embodiment 1.

Figure 10:
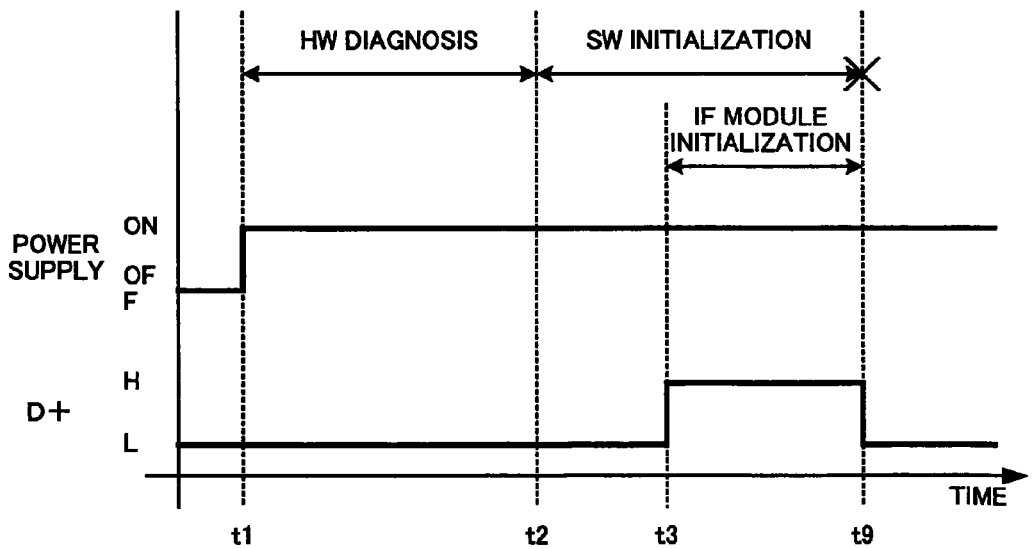
FIG. 10 shows processing to be conducted when initialization of SW is failed in the potential pull-up of the D+ line according to the embodiment 1.

FIG. 10 shows processing in a case where the initialization of SW is failed when the potential of the D+ line is pulled up according to the embodiment 1. Referring to FIG. 10, the HW diagnosis starts at the time t1, and the initializations of the SW and IF module 21 start respectively at the time t2 and the time t3.

If the initialization of the SW fails at time t9, or if the initialization of the IF module 21 is not completed in time before the start of the communication with the master station, the pull-up of the potential of the D+ line is suspended, and the potential of the D+ line is pulled down to the ground level via the pull-down resistor 12 of the master station 10.

Therefore, the pull-up control section 22 monitors the SW and the IF module 21 in the peripheral apparatus 2, and when the pull-up control section 22 detects the failure in the initialization of the SW or the failure or the delay in the initialization of the IF module 21, the pull-up control section 22 turns off the switch 24 so as to suspend the pull-up of the potential of the D+ line.

With the above operations, even if the initialization or the IF module 21 of the SW of the peripheral apparatus 2 fails, since subsequent processing is suspended, the communication between the information processing apparatus 1 and the peripheral apparatus 2 can be carried out by initializing of the SW or the IF module 21 of the peripheral apparatus 2 again.

If the initialization of the IF module 21 is not completed before the start of the communication with the master station, the potential of the D+ line is once pulled down to the ground level. However, the communication between the information processing apparatus 1 and the peripheral apparatus 2 can be carried out by pulling up the potential of the D+ line again.

Note that although the descriptions have been given of the operations complying with the USB standard in the embodiments 1 to 5, the present invention can also be applied to communication apparatuses which operate to start a communication after the master station recognizes the connection to the slave station.

What is claimed is:

1. A communication apparatus comprising:
   a connection notifying unit that causes a communication destination party to detect a connection;
   an interface unit that requires initialization, and controls a communication with the communication destination party after the initialization is completed; and
   a connection notification control unit that changes a state of the connection notifying unit to a state of causing the communication destination party to detect the connection during a period from a start of the initialization of the interface unit before a completion of the initialization of the interface unit.

2. The communication apparatus according to claim 1, wherein the connection notification control unit changes the state of the connection notifying unit to the state of causing the communication destination party to detect the connection upon a start of the initialization of the interface unit.

3. The communication apparatus according to claim 1, wherein the connection notification control unit changes the state of the connection notifying unit to the state of causing the communication destination party to detect the connection during a period from a time when a state of a device in which the interface unit is provided is changed to a predetermined state to the completion of the initialization of the interface unit.

4. The communication apparatus according to claim 1, wherein the connection notification control unit changes the state of the connection notifying unit to a state of causing the communication destination party not to detect the connection during a suspension of a startup processing of a device in which the interface unit is provided or a initialization of the interface unit.

5. The communication apparatus according to claim 1, wherein the connection notifying unit causes the communication destination party to detect the connection by pulling up the potential of a predetermined signal line among signal lines connecting the interface unit and the communication destination party.

6. The communication apparatus according to claim 1, in which the interface unit includes a master station, a slave station, and a communication line that couples the master station to the slave station,
   the slave station including a circuit that pulls up an electric potential of the communication line to a predetermined value, and maintains the electric potential of the communication line at the predetermined value by means of the circuit upon turning on the power, and
   the master station including a detector that detects the electric potential of the communication line maintained at the predetermined value by means of the circuit so as to detect the slave station, and taking an initiative for the communication with the slave station when the master station detects the slave station by means of the detector, the apparatus being provided in a slave station of a bus communication system,
   wherein the communication destination party is the master station.

7. A slave station in a bus communication system that comprises a master station, a slave station, and a communication line that couples the master station to the slave station,
   the slave station including a circuit that pulls up an electric potential of the communication line to a predetermined value, and maintains the electric potential of the communication line at the predetermined value by means of the circuit upon turning on the power,
   the master station including a detector that detects the electric potential of the communication line maintained at the predetermined value by means of the circuit so as to detect the slave station, and taking an initiative for the communication with the slave station when the master station detects the slave station by means of the detector, the apparatus being provided in the bus communication system,
   wherein the electric potential of the communication line is maintained by the circuit at the predetermined value during a period from a start of initialization of the slave station before a completion of the initialization of the slave station.

8. A control method for a communication apparatus comprising a connection notifying unit that causes a communication destination party to detect a connection; and an interface unit that requires initialization and controls a communication with the communication destination party after a completion of the initialization of the interface unit, wherein
   a state of the connection notifying unit is changed to a state of causing the communication destination party to detect the connection during a period from a start of the initialization of the interface unit to a completion of the initialization of the interface unit.

9. The control method for a communication apparatus according to claim 8, wherein the state of the connection notifying unit is changed to the state of causing the communication destination party to detect the connection upon a start of the initialization of the interface unit.

10. The control method for a communication apparatus according to claim 8, wherein the state of the connection notifying unit is changed to the state of causing the communication destination party to detect the connection during a period from a time when a state of a device in which the interface unit is provided is changed to a predetermined state to the completion of the initialization of the interface unit.

11. The control method for a communication apparatus according to claim 8, wherein the state of the connection notifying unit is changed to a state of causing the communication destination party not to detect the connection during a suspension of a startup processing of a device in which the interface unit is provided or the initialization of the interface unit.

12. The control method for a communication apparatus according to claim 8, wherein the communication destination party is caused to detect the connection by pulling up the potential of a predetermined signal line among signal lines connecting the interface unit and the communication destination party.

13. The control method for a communication apparatus according to claim 8, in which the interface unit includes a master station, a slave station, and a communication line that couples the master station to the slave station, the slave station including a circuit that pulls up an electric potential of the communication line to a predetermined value, and maintains the electric potential of the communication line at the predetermined value by means of the circuit upon turning on the power, and the master station including a detector that detects the electric potential of the communication line maintained at the predetermined value by means of the circuit so as to detect the slave station, and taking an initiative for the communication with the slave station when the master station detects the slave station by means of the detector, the apparatus being provided in a slave station of a bus communication system, wherein the communication destination party is the master station.

14. A control method for a slave station in a bus communication system comprising a master station, a slave station, and a communication line that couples the master station to the slave station, the slave station including a circuit that maintains pulls UP an electric potential of the communication line to a predetermined value, and maintains the electric potential of the communication line at the predetermined value by means of the circuit upon turning on the power, the master station including a detector that detects the electric potential of the communication line maintained at the predetermined value by means of the circuit so as to detect the slave station, and taking an initiative for the communication with the slave station when the master station detects the slave station by means of the detector, wherein the electric potential of the communication line is maintained by the circuit at the predetermined value during a period from a start of initialization of the slave station before a completion of the initialization of the slave station.

* * * * *